N. W. SPAULDING.
SAW TOOTH.
No. 10,312. Reissued Apr. 10, 1883.
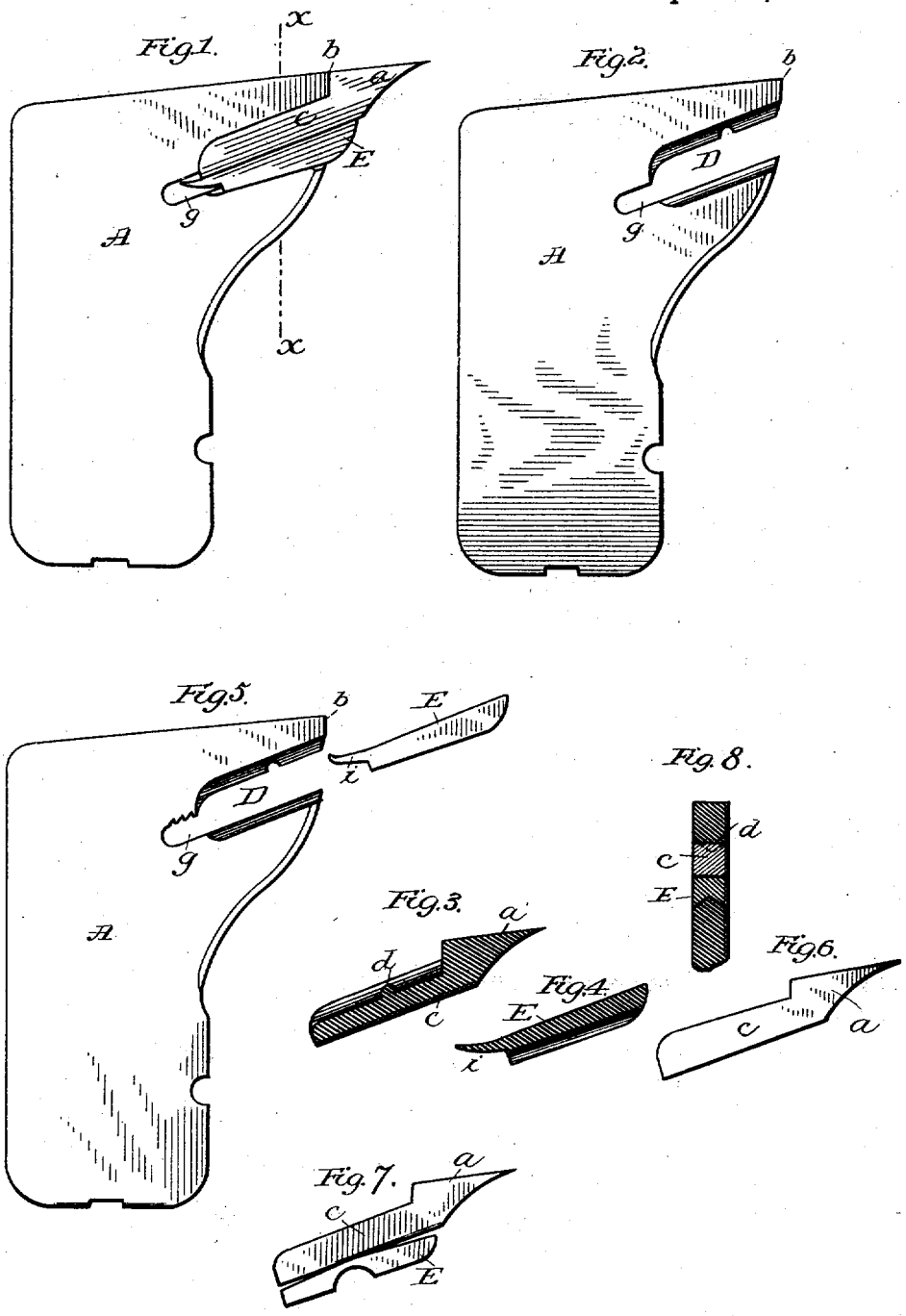
Attest:
Nathan Dougaldson
L. W. Seely
Inventor:
N. W. Spaulding,
by Ellis Spear
Atty.
N. PETERS, Photo-Lithographer, Washington, D. C.

UNITED STATES PATENT OFFICE.

NATHAN W. SPAULDING, OF SAN FRANCISCO, CALIFORNIA.

SAW-TOOTH.

SPECIFICATION forming part of Reissued Letters Patent No. 10,312, dated April 10, 1883.

Original No. 268,137, dated November 28, 1882. Application for reissue filed February 23, 1883.

*To all whom it may concern:*

Be it known that I, NATHAN W. SPAULDING, of the city and county of San Francisco, State of California, have invented an Improvement in Saw-Teeth; and I hereby declare the following to be a full, clear, and exact description thereof.

My invention relates to certain improvements in the teeth of saws, and it is especially applicable to that class known as "inserted teeth."

It consists, mainly, in the employment of removable bit-holders, which are fitted to the saw-plate; in the formation of an independent removable point or bit for each tooth or holder, and in a novel method of securing these points firmly, but at the same time so that they may be easily removed.

Referring to the accompanying drawings for a more complete explanation of my invention, Figure 1 is a view of a holder having my improved point. Fig. 2 is a view of the bit-holder, showing the socket for the bit. Fig. 3 is a view of the point or bit. Fig. 4 is a view of the locking-key. Fig. 5 is a view of a serrated bit-holder and its key. Figs. 6 and 7 are modified forms of the bit and key. Fig. 8 is a section on line *x x* of Fig. 1.

As shown in the drawings, A is a bit-holder formed like the body of a tooth such as is used in connection with circular saws, this bit-holder being formed independent of the saw-plate, and having grooves which fit V-shaped tongues or projections in the socket into which it is inserted in the saw-plate, and wherein it is locked by any suitable device.

In order to reduce the expense of sharpening or replacing worn teeth to the smallest amount, I employ small cutting teeth or bits which are in the form of independent points to fit the bit-holders A.

These bits are struck up in dies, and have a point, *a*, the back of which forms a nearly or quite straight line with the top of the bit-holder, and terminating at the shoulder *b*, which rests against a correspondingly-shaped end of the bit-holder, as shown. From the bottom of the shoulder *a* the shank *c* extends in a straight line, and is grooved upon its back to fit a corresponding V-shaped tongue or projection formed in the upper part of the socket D, into which the point is fitted. The lower part of the point *a* may be concaved or formed as shown, so as to follow the general contour of the throat, or according to the best known form for cutting and clearance. The lower part of the shank *c* is straight and flat, and nearly or quite parallel with its back, and the sliding key E fits against this face. The grooved back of the shank *c* has a transverse lug or cross-bar of any suitable shape at *d*, and this fits into a corresponding notch in the V-shaped projection or tongue in the upper part of the socket D, so that when the bit is in place this lock prevents any end motion, and it is entirely concealed by the V-shaped groove in which it lies.

Instead of forming a small lug and notch upon the bit, the whole back of the bit may be curved, as shown in Fig. 7; or the bit may be made tapering from the shoulder *b*, being wider at its rear end. In each case a key would secure the bit firmly.

The socket D is made considerably wider than the width of the shank *c*, and its lower part has an extension, *g*, beyond the point reached by the shank.

The sliding key E is grooved on its lower edge to fit a corresponding tongue or projection in the lower part of the socket D, and its opposite face fits against the lower side of the shank *c* of the bit. In the present case I have shown this key formed with a thin spring, *i*, which curves slightly upward at the rear end. This spring presses against the rear end or heel of the shank *c* when the key is driven into place, and its object is to prevent the loosening of the key. It will be manifest that the key itself might be cut away in the center, so as to be elastic at that point, or be formed in other ways to attain the end desired, which is the constant elastic pressure of the key upon the under side of the bit to hold it in place. The extension *g* of the socket receives the point of the spring *i*, and also provides a space into which a tool may be introduced to drive out the key when desired. The lug and socket on the top of the shank *c* serve to retain the bit firmly in place, and prevent all end movement when the key is inserted, but when the latter is removed the bit will at once drop out.

In some cases it may be found preferable to turn the rear end of the spring *i* up or down a little, and to form serrations upon the back part of the socket extension, into which the end of the spring drops, to increase its frictional hold and prevent its slipping out or withdrawing when in use, and the faces of the bit and key may also be tongued and grooved where they meet to prevent any side movement.

Although I have described my bit in the present case as fitted into a certain form of bit-holder, it will be manifest that it may be fitted into any bit-holder by making certain mechanical changes to suit it to the particular holder in which it is to be used; or, if desired, the saw-plate itself may have the sockets formed directly in it to receive the bits and keys without the use of independent bit-holders. I prefer, however, to employ bit-holders on account of the wear caused by the rapid and constant passage of the sawdust between the sides of the kerf and a certain point in the saw. This wear takes place chiefly at a short distance back of the point of the teeth, so that when the bits are inserted into the saw-plate their sockets will be worn thin from the throat to the back of the sockets, just behind the cutting-bit, and the saw becomes damaged and must be provided with new sockets in a short time. By the use of my bit-holders this wear takes place across them instead of the saw-plate, and the expense of renewing them when necessary is comparatively small.

I am aware that a saw-plate has been provided with a socket in which have been held two clamps secured in such socket by a throat-piece and wedge-key, and that a removable point or tooth has been held between such clamps, and I am aware that a removable saw-tooth has been held in position in a saw-plate by a pivoted cam, and I hereby disclaim both of such devices.

Having thus described my invention, what I claim as new, and desire to secure by Letters Patent, is—

1. In combination with a saw-plate, a removable bit-holder having a socket to receive both a removable saw tooth or bit and a sliding locking wedge or key, which fits against the bit and locks it into the holder, said holder being formed of one piece, all as set forth.

2. The bit *a*, with its shank *c*, fitted to the socket in the bit-holder, with the transverse lug *d* and notch, in combination with a sliding key, E, having a spring, *i*, projecting from its rear end, substantially as and for the purpose herein described.

3. In a saw, the bit-holder A, having a socket, D, to receive the bit and key, and having serrations *n*, in combination with a removable bit, *a*, and a key, E, having the spring-pawl *i*, substantially as herein described.

4. A bit-holder having the socket D, tongued or grooved upon opposite sides to hold the shank of the cutting-bit, and its locking key or wedge, in combination with the tooth or bit *a*, and the locking sliding key or wedge E, having corresponding tongues and grooves upon their adjacent or meeting faces.

5. The bit *a*, with its shank *c*, fitted to the socket in the bit-holder, and with transverse lug *d*, in combination with the bit-holder A, provided with a notch corresponding to the lug *d*, and with a sliding key, E, the parts being adapted to each other and operating substantially as described.

6. The bit *a*, with its shank *c*, having a fixed transverse lug, *d*, fitting a corresponding notch in the socket D, which receives the shank, in combination with the sliding straight key E, substantially as herein described.

In witness whereof I hereunto set my hand.

NATHAN W. SPAULDING.

Witnesses:
S. H. NOURSE,
G. W. EMERSON.